(12) United States Patent
Kanamaru et al.

(10) Patent No.: US 9,417,943 B2
(45) Date of Patent: Aug. 16, 2016

(54) SAFETY COMPUTING DEVICE, SAFETY INPUT DEVICE, SAFETY OUTPUT DEVICE, AND SAFETY CONTROLLER

(71) Applicants: Hiroo Kanamaru, Tokyo (JP); Yoshitomo Asano, Tokyo (JP); Keiichi Yato, Tokyo (JP); Hidetoshi Harada, Tokyo (JP)

(72) Inventors: Hiroo Kanamaru, Tokyo (JP); Yoshitomo Asano, Tokyo (JP); Keiichi Yato, Tokyo (JP); Hidetoshi Harada, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 14/420,988

(22) PCT Filed: Mar. 11, 2013

(86) PCT No.: PCT/JP2013/056612
§ 371 (c)(1),
(2) Date: Feb. 11, 2015

(87) PCT Pub. No.: WO2014/041829
PCT Pub. Date: Mar. 20, 2014

(65) Prior Publication Data
US 2015/0220378 A1 Aug. 6, 2015

(30) Foreign Application Priority Data

Sep. 11, 2012 (WO) .................. PCT/JP2012/073179

(51) Int. Cl.
*G06F 11/00* (2006.01)
*G06F 11/07* (2006.01)
(Continued)

(52) U.S. Cl.
CPC ............. *G06F 11/0751* (2013.01); *G05B 9/03* (2013.01); *G06F 11/079* (2013.01); *G06F 11/08* (2013.01); *G06F 11/263* (2013.01); *G05B 2219/24182* (2013.01)

(58) Field of Classification Search
CPC . G06F 11/0751; G06F 11/079; G06F 11/263; G06F 11/08; G06F 11/0736; G06F 11/14; G06F 11/1608; G05B 9/03; G05B 2219/24182

USPC ........ 714/10, 11, 6.24, 21, 25, 27, 30, 31, 32, 714/33, 37, 45, 47.1, 49
See application file for complete search history.

(56) References Cited

U.S. PATENT DOCUMENTS

| 4,665,477 A | 5/1987 | Desmazieres |
| 6,426,712 B1 * | 7/2002 | Hare ...................... H03M 1/06 324/76.11 |

(Continued)

FOREIGN PATENT DOCUMENTS

| DE | 4309789 A1 | 9/1994 |
| EP | 2 413 484 A2 | 2/2012 |

(Continued)

OTHER PUBLICATIONS

International Search Report of PCT/JP2013/056612 dated Apr. 2, 2013.

(Continued)

*Primary Examiner* — Joseph D Manoskey
(74) *Attorney, Agent, or Firm* — Sughrue Mion, PLLC

(57) ABSTRACT

A safety computing device includes a processor and a memory. The memory includes a first memory area and a second memory area having an address different from the first memory area. The processor includes an execution control unit performing a first process including the program process on input data written in the first memory area, and a second process including the program process on input data written in the second memory area and addition of redundancy code to output data written in the second memory area, a result collating unit collating output data to which redundancy code is added in the first and second processes, a computation diagnosis unit diagnosing presence or absence of failure in the processor and the memory, and an abnormality processing unit that, when an abnormality is detected by at least one of redundancy check, collation, and diagnosis, stops outputting output data.

11 Claims, 11 Drawing Sheets

(51) Int. Cl.
*G05B 9/03* (2006.01)
*G06F 11/08* (2006.01)
*G06F 11/263* (2006.01)

(56) References Cited

U.S. PATENT DOCUMENTS

| | | | |
|---|---|---|---|
| 7,328,370 B2* | 2/2008 | Gibart | G05B 9/03 700/12 |
| 2010/0235682 A1* | 9/2010 | Yoshida | G05B 19/058 714/25 |
| 2011/0043323 A1* | 2/2011 | Hamasako | G05B 9/03 340/3.43 |
| 2011/0083041 A1* | 4/2011 | Rohleder | G06F 11/167 714/15 |
| 2011/0173497 A1* | 7/2011 | Nakatani | G05B 19/0428 714/32 |
| 2012/0173924 A1* | 7/2012 | Xiao | G06F 11/1048 714/15 |

FOREIGN PATENT DOCUMENTS

| | | |
|---|---|---|
| JP | 59-194204 A | 11/1984 |
| JP | 63-298602 A | 12/1988 |
| JP | 02-008911 A | 1/1990 |
| JP | 02-219101 A | 8/1990 |
| JP | 2000-148216 A | 5/2000 |
| JP | 2002-358106 A | 12/2002 |
| JP | 2010-262432 A | 11/2010 |
| JP | 2011-257889 A | 12/2011 |

OTHER PUBLICATIONS

Communication dated Apr. 7, 2016, issued by the German Patent and Trademark Office in counterpart German Application No. 112013004427.7.

* cited by examiner

SAFETY COMPUTING DEVICE, SAFETY INPUT DEVICE, SAFETY OUTPUT DEVICE, AND SAFETY CONTROLLER

CROSS REFERENCE TO RELATED APPLICATIONS

This is a National Stage of International Application No. PCT/JP2013/056612 filed Mar. 11, 2013, claiming priority based on Application No. JP2012/073179 filed Sep. 11, 2012, the contents of all of which are incorporated herein by reference in their entirety.

FIELD

The present invention relates to a safety computing device, a safety input device, a safety output device, and a safety controller, and particularly relates to a configuration of a safety controller that performs internal diagnosis to ensure a control operation with high reliability.

BACKGROUND

Safety controllers for safety control are required to be capable of detecting both a hardware failure, which is a permanent failure in a circuit in a processor and a memory, and a software failure, which is a temporary failure, in accordance with, for example, IEC61508, which is the international standard concerning functional safety.

The known methods of internal diagnosis performed by a safety controller, for example, include a method of performing mutual diagnosis in which the computation results from two processors are collated and a method of performing the same computation process twice with one processor and then comparing the processing results. For example, a method is disclosed in Patent Literature 1 in which the results obtained by performing the same computation process twice with one processor are written in different memories.

CITATION LIST

Patent Literature

Patent Literature 1: Japanese Patent Application Laid-open No. S59-194204

SUMMARY

Technical Problem

With the configuration described in Patent Literature 1, the outputs from the two memories are made simplex by using a duplex demultiplexer and a flip-flop circuit. The results obtained by performing the computation process twice with the processor are collated by the duplex hardware circuit. When this duplex circuit configuration is used, a redundant circuit configuration is necessary compared with a typical configuration composed of a simplex input/output circuit; therefore, there is a problem in that the safety controller becomes complicated and increases in cost.

The present invention has been achieved in view of the above and an object of the present invention is to obtain a safety computing device, a safety input device, a safety output device, and a safety controller that realize simplification and low cost by using a simplex circuit configuration and that are capable of detecting both a hardware failure and a software failure.

Solution to Problem

In order to solve the above problems and achieve the object, the present invention relates to a safety computing device including: a processor that executes a program process on input data; and a memory that stores the input data input to the processor and output data that is a result of the program process, wherein the memory is capable of storing the input data and the output data in each of a first memory area and a second memory area having an address different from an address of the first memory area, and the processor includes an execution control unit that performs a first process, which includes the program process performed on the input data written in the first memory area and addition of a redundancy code to the output data that is a result of the program process and is written in the first memory area, and a second process, which includes the program process performed on the input data written in the second memory area and addition of a redundancy code to the output data that is a result of the program process and is written in the second memory area, a result collating unit that collates the output data to which the redundancy code is added in the first process and the output data to which the redundancy code is added in the second process, a computation diagnosis unit that diagnoses, by computation, presence or absence of a failure in the processor and the memory, and an abnormality processing unit that, when an abnormality is detected by at least one of a redundancy check performed on the input data and the output data, a collation performed by the result collating unit, and a diagnosis performed by the computation diagnosis unit, stops outputting the output data.

Advantageous Effects of Invention

The safety computing device according to the present invention includes a simplex circuit configuration including a processor and a memory. The execution control unit performs a program process on each of the input data read from the first memory area and the input data read from the second memory area. The result collating unit collates the results of the program process performed on both pieces of the input data to detect a software failure. The computation diagnosis unit detects a hardware failure in the processor and the memory. Consequently, an effect is obtained where the safety computing device can realize simplification and low cost by using a simplex circuit configuration and can detect both a hardware failure and a software failure.

DESCRIPTION OF EMBODIMENTS

Exemplary embodiments of a safety computing device, a safety input device, a safety output device, and a safety controller according to the present invention will be explained below in detail with reference to the drawings. This invention is not limited to the embodiments.

First Embodiment

Figure 1:
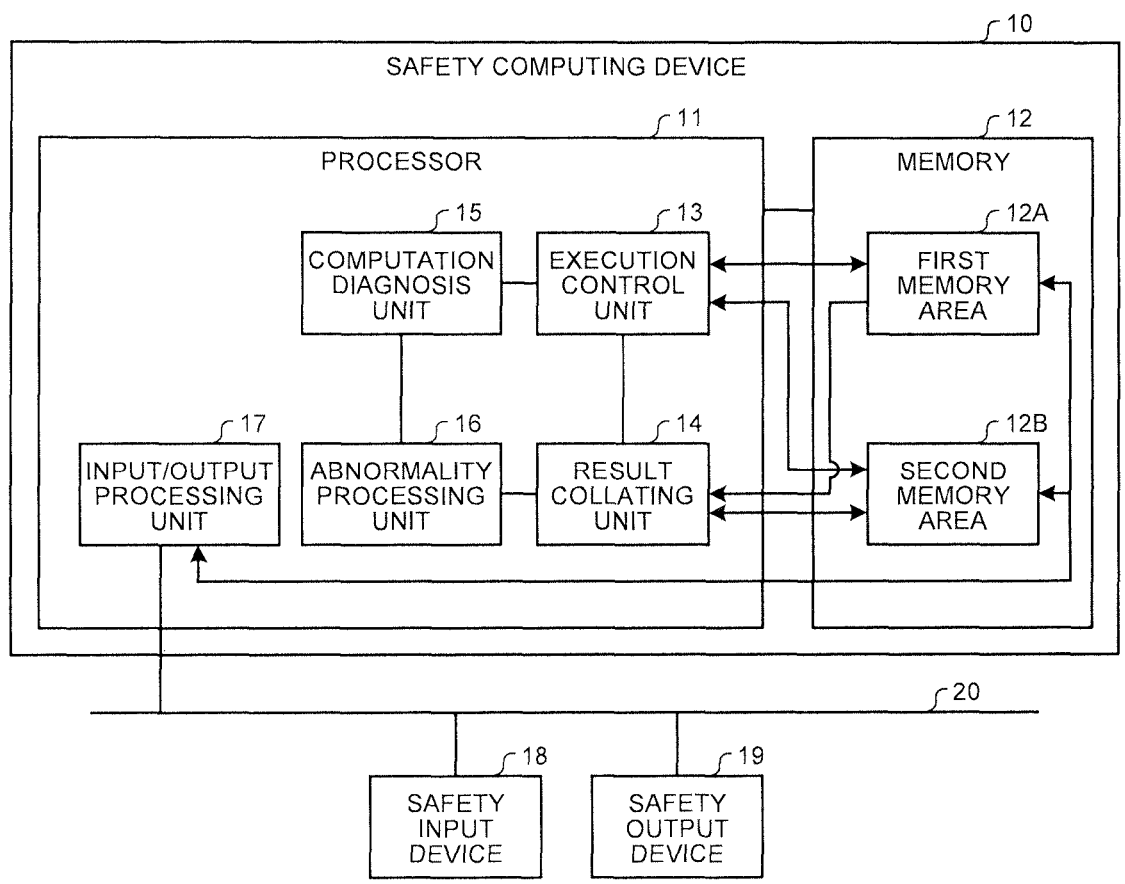
FIG. 1 is a block diagram illustrating the configuration of a safety controller that includes a safety computing device according to a first embodiment of the present invention.

FIG. 1 is a block diagram illustrating the configuration of a safety controller that includes a safety computing device according to a first embodiment of the present invention. The safety controller includes a safety computing device 10, a safety input device 18, and a safety output device 19.

The safety computing device 10 performs a computation process for safety control. The safety input device 18 receives an input of input signals to the safety controller. The safety output device 19 outputs output signals to external destinations from the safety controller. The safety computing device 10, the safety input device 18, and the safety output device 19 are internally connected to each other via a bus 20.

The safety computing device 10 includes a processor 11 and a memory 12. The processor 11 performs a program process on input data input to the safety computing device 10. The memory 12 stores input data input to the processor 11 and output data that is a result of the program process.

The memory 12 includes a first memory area 12A and a second memory area 12B, which are independent from each other. The second memory area 12B has addresses different from those of the first memory area 12A. Both the first memory area 12A and the second memory area 12B can store input data and output data.

The processor 11 includes an execution control unit 13, a result collating unit 14, a computation diagnosis unit 15, an abnormality processing unit 16, and an input/output processing unit 17. The execution control unit 13 performs a first process on the input data written in the first memory area 12A and a second process on the input data written in the second memory area 12B. The result collating unit 14 collates the output data written in the first memory area 12A in the first process and the output data written in the second memory area 12B in the second process.

The computation diagnosis unit 15 diagnoses, by computation, the presence or absence of a failure in the processor 11 and the memory 12. The computation diagnosis unit 15 diagnoses the processor 11 and the memory 12 by using, for example, a test pattern. When an abnormality is detected by at least one of the redundancy check performed on input data and output data, the collation performed by the result collating unit 14, and the diagnosis performed by the computation diagnosis unit 15, the abnormality processing unit 16 stops outputting output data.

The input/output processing unit 17 transfers input data between the safety input device 18 and the first memory area 12A and the second memory area 12B and transfers output data between the safety output device 19 and the first memory area 12A and the second memory area 12B.

Figure 2:
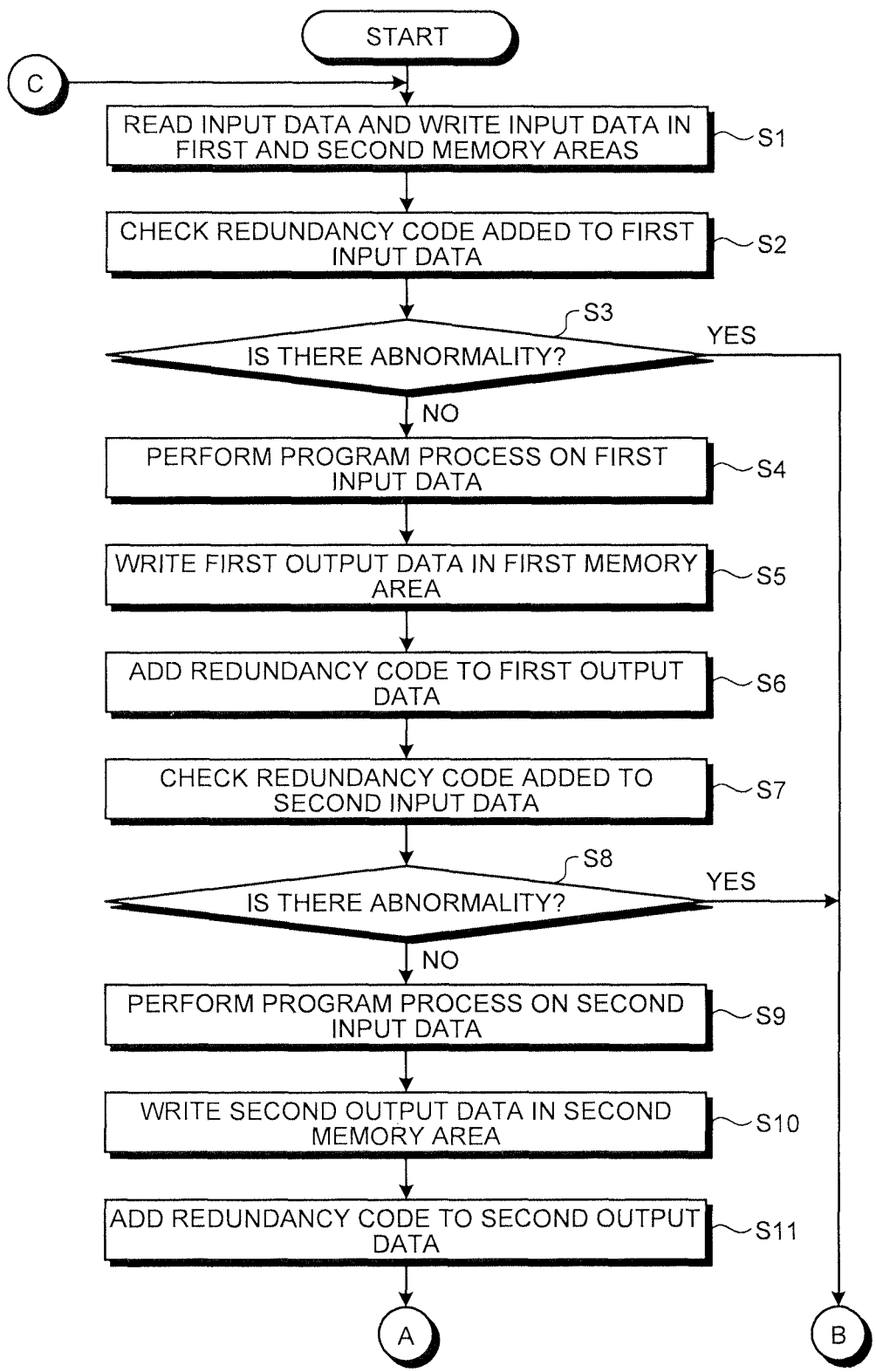
FIG. 2 is a (first) flowchart illustrating an operation procedure of the safety controller.
Figure 3:
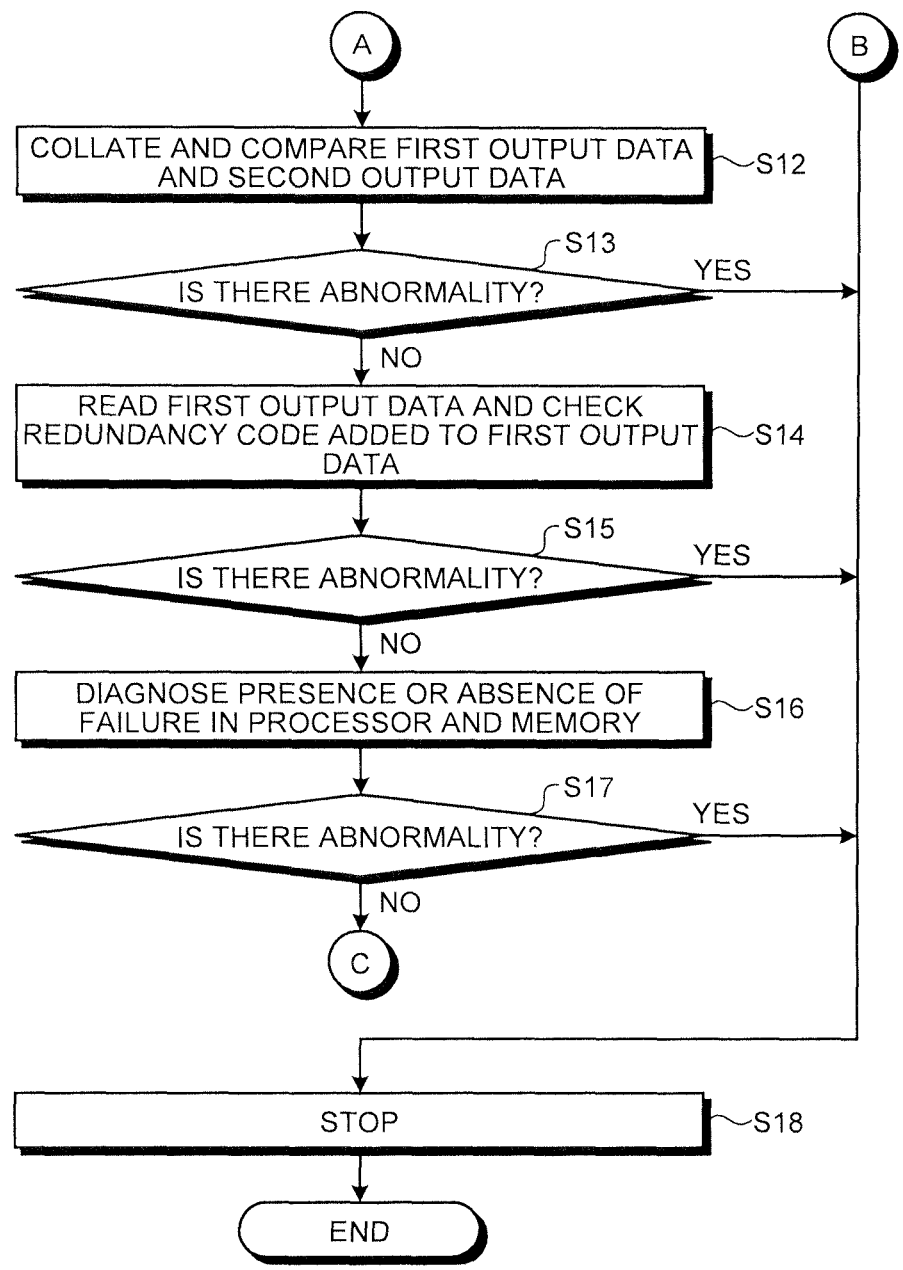
FIG. 3 is a (second) flowchart illustrating the operation procedure of the safety controller.

FIG. 2 and FIG. 3 are flowcharts illustrating the operation procedures of the safety controller. The safety input device 18 adds a redundancy code to input data. The input/output processing unit 17 reads the input data to which the redundancy code is added from the safety input device 18. The input/output processing unit 17 writes the read input data in the first memory area 12A and the second memory area 12B (Step S1).

The execution control unit 13 checks the redundancy code added to the input data (first input data) written in the first memory area 12A (Step S2). The redundancy code is, for example, a CRC (Cyclic Redundancy Code).

When an abnormality is detected by the redundancy check (Yes at Step S3), the abnormality processing unit 16 stops the operation of the safety controller (Step S18). In contrast, when it is determined by the redundancy check at Step S2 that there is no abnormality (No at Step S3), the execution control unit 13 performs the program process on the first input data (Step S4). The program is, for example, an application program created by the user. In the program process, the execution control unit 13 uses the first input data and memory's own stored data stored in the first memory area 12A.

The execution control unit 13 writes the output data (first output data) that is the processing result at Step S4 in the first memory area 12A (Step S5). The execution control unit 13 rewrites the memory's own stored data stored in the first memory area 12A in accordance with the processing result at Step S4.

The execution control unit 13 adds a redundancy code to the first output data written in the first memory area 12A (Step S6). The redundancy code is, for example, a CRC. The processes from Step S2 to Step S6 correspond to the first process for the first input data written in the first memory area 12A.

Next, the execution control unit 13 checks the redundancy code added to the input data (second input data) written in the second memory area 12B (Step S7). The redundancy code is, for example, a CRC. When an abnormality is detected by the redundancy check (Yes at Step S8), the abnormality processing unit 16 stops the operation of the safety controller (Step S18). In contrast, when it is determined by the redundancy check at Step S7 that there is no abnormality (No at Step S8), the execution control unit 13 performs the program process on the second input data (Step S9).

The first memory area 12A and the second memory area 12B have the same memory map except that their offset addresses are different from each other. The execution control unit 13 executes the same program on the second input data such that the offset address is different from that when the first input data is processed at Step S4. In the program process, the execution control unit 13 uses the second input data and memory's own stored data stored in the second memory area 12B.

The execution control unit 13 writes the output data (second output data) that is the processing result at Step S9 in the second memory area 12B (Step S10). The execution control unit 13 rewrites the memory's own stored data stored in the second memory area 12B in accordance with the processing result at Step S9.

The execution control unit 13 adds a redundancy code to the second output data written in the second memory area 12B (Step S11). The redundancy code is, for example, a CRC. The processes from Step S7 to Step S11 correspond to the second process for the second input data written in the second memory area 12B.

Next, the result collating unit 14 collates and compares the first output data to which the redundancy code is added at Step S6 and the second output data to which the redundancy code is added at Step S11 (Step S12). The result collating unit 14 may include memory's own stored data whose values may change in the range of the collation and comparison in addition to the first and second output data.

When an abnormality is detected by the collation performed by the result collating unit 14 (Yes at Step S13), the abnormality processing unit 16 stops the operation of the safety controller (Step S18). In contrast, when it is determined by the collation performed by the result collating unit 14 that there is no abnormality (No at Step S13), the input/output processing unit 17 reads the first output data from the first memory area 12A and writes the first output data in the safety output device 19.

The safety output device 19 checks the redundancy code added to the first output data written by the input/output processing unit 17 (Step S14). When an abnormality is detected by the redundancy check (Yes at Step S15), the abnormality processing unit 16 stops the safety output device 19 from outputting the first output data (Step S18). In contrast, when it is determined by the redundancy check at Step S14 that there is no abnormality (No at Step S15), the safety output device 19 outputs the first output data.

Next, the computation diagnosis unit 15 diagnoses the presence or absence of a failure in the processor 11 and the memory 12 (Step S16). The computation diagnosis unit 15 diagnoses the computing unit (ALU: Arithmetic and Logic Unit) of the processor 11 by using a test pattern. The test pattern is selected such that it is possible to confirm that each bit of the registers of the ALU can be independently turned on and off.

For example, in the case of the ALU that performs an addition operation, the ALU checks each of the bits (0,0), (0,1), (1,0), and (1,1) of the two registers that are computation targets and performs a carry operation from the lower bit. Furthermore, in order to ensure that there is no short-circuit between adjacent memory bits, test patterns (0x5555 and 0xAAAA) are selected such that adjacent bits have different results.

The computation diagnosis unit 15 writes and reads test patterns that are different from each other with respect to the specified addresses in the first memory area 12A and the second memory area 12B, respectively. The first memory area 12A and the second memory area 12B have offset addresses different from each other but have the same memory map. If the same test pattern is used, even if there is a failure in which an offset address line is stuck, the same value is written in the same address of the first memory area 12A and the second memory area 12B; therefore; it is difficult to accurately perform a failure diagnosis. The computation diagnosis unit 15 writes in advance different values in the specified addresses in the first memory area 12A and the second memory area 12B and compares the read values with what the values were when they were written, thereby diagnosing a failure in the address lines.

When an abnormality is detected by the failure diagnosis performed on the processor 11 and the memory 12 (Yes at Step S17), i.e., when at least one of the processor 11 and the memory 12 has a failure, the abnormality processing unit 16 stops the operation of the safety controller (Step S18). The abnormality processing unit 16 sets the signal output from the first memory area 12A and the second memory area 12B to off.

In contrast, when it is determined by the failure diagnosis performed on the processor 11 and the memory 12 that there is no abnormality, i.e., when it is determined that both the processor 11 and the memory 12 have no failure (No at Step S17), the safety controller returns to Step S1 and continues the operation for safety control.

When an abnormality is detected by at least one of the redundancy check performed on input data and output data, the collation performed by the result collating unit 14, and the diagnosis performed by the computation diagnosis unit 15, the safety controller enters an infinite idle loop state because of the stop of the operation at Step S18. Therefore, the safety controller stops outputting output data at the time point when an abnormality is detected.

When a software failure occurs in any of the processor 11 and the memory 12 of the safety computing device 10, the safety controller can detect the occurrence of the failure from the collation result obtained by the result collating unit 14. When there is a software failure, the safety controller may continue the operation after performing a predetermined process other than stopping the operation.

Even if a software failure is detected in a certain cycle in a software process, the software failure may be eliminated in the next and subsequent cycles. Therefore, for example, the safety controller may use, for a cycle in which a failure was detected, output data in a cycle immediately before the cycle in which the failure was detected so that it is not determined that an error has occurred and the safety controller may continue the process in the next and subsequent cycles. When the safety controller detects a failure continuously for a predetermined number of cycles, the safety controller may stop the operation.

When a hardware failure occurs in any of the processor 11 and the memory 12, the safety controller can detect the occurrence of the failure from the diagnosis result obtained by the computation diagnosis unit 15. If a hardware failure is detected in a certain cycle in a software process, the hardware failure is not eliminated in the next and subsequent cycles. Therefore, when a hardware failure is detected, the safety controller immediately stops the operation.

The safety controller uses a simplex circuit configuration configured from the processor 11, the memory 12, the safety input device 18, and the safety output device 19. The safety controller can detect both a hardware failure and a software failure without using a duplex hardware structure. The safety controller can realize simplification and low cost by using a simplex circuit configuration.

Second Embodiment

Figure 4:
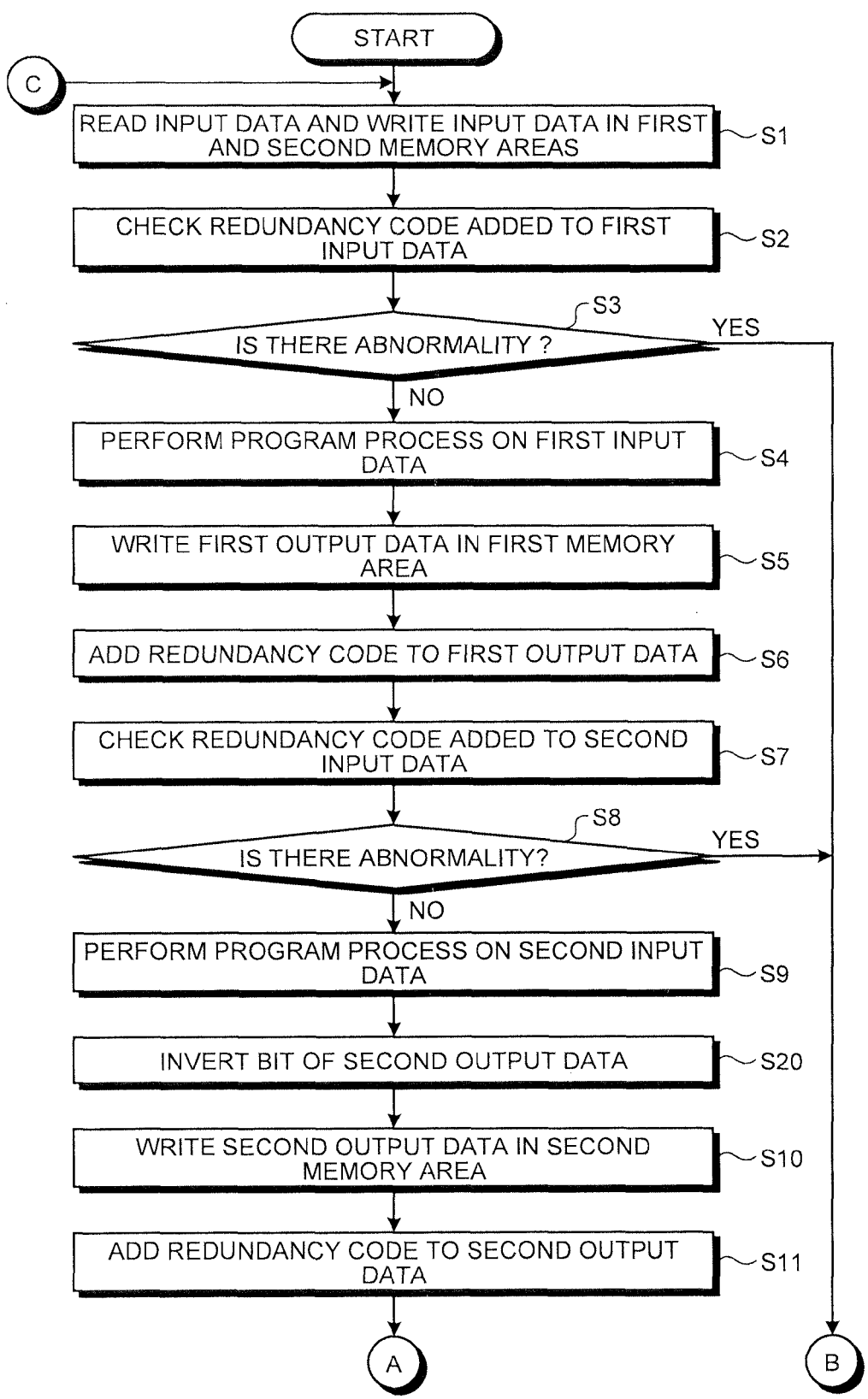
FIG. 4 is a (first) flowchart illustrating an operation procedure of a safety controller that includes a safety computing device according to a second embodiment of the present invention.
Figure 5:
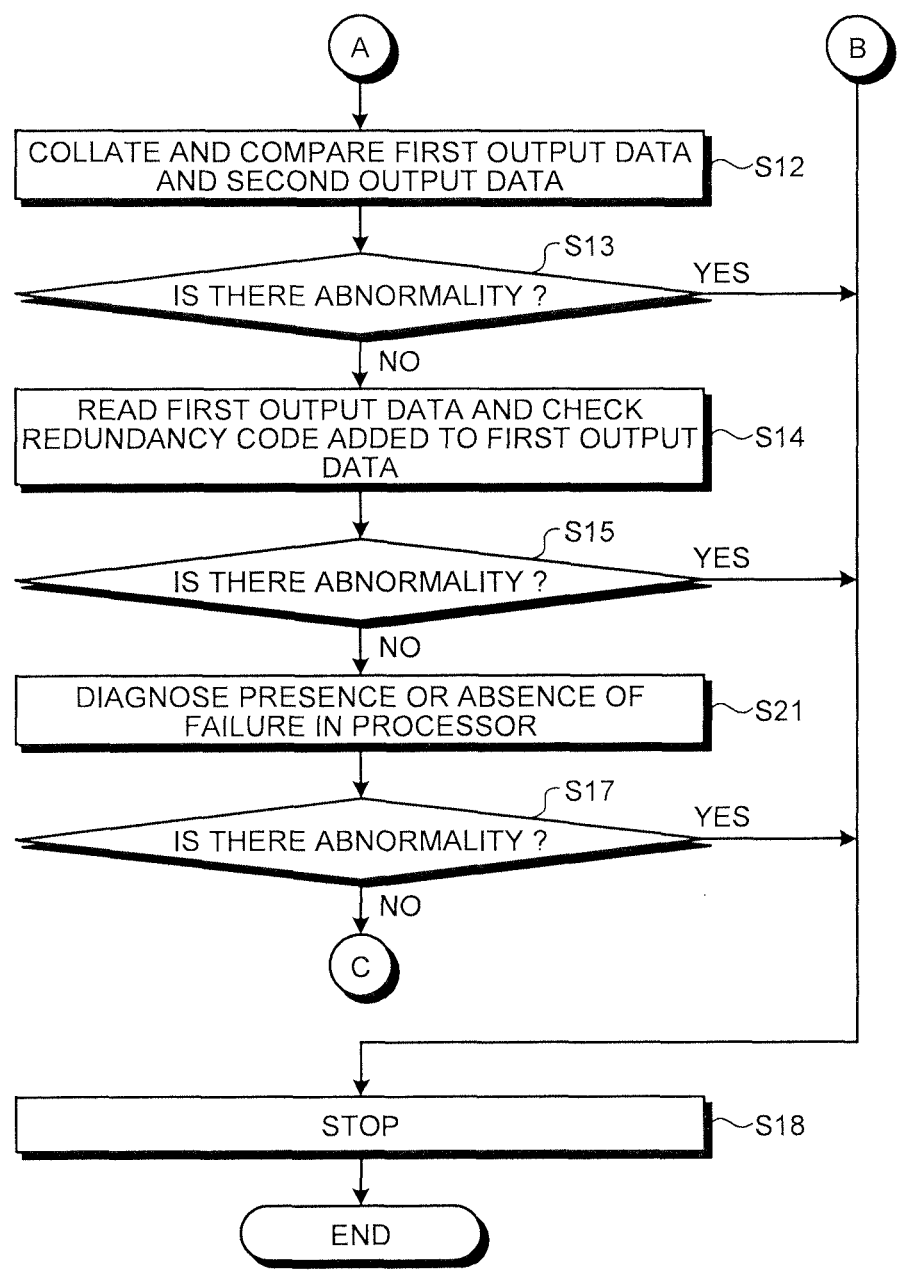
FIG. 5 is a (second) flowchart illustrating the operation procedure of the safety controller that includes the safety computing device according to the second embodiment of the present invention.

FIG. 4 and FIG. 5 are flowcharts illustrating the operation procedures of a safety controller that includes a safety computing device according to a second embodiment of the present invention. The safety controller according to the present embodiment has the same configuration as that of the safety controller (see FIG. 1) according to the first embodiment. The procedure from Step S1 to Step S9 in the operation procedure in the present embodiment is similar to that from Step S1 to Step S9 (see FIG. 2) in the operation procedure according to the first embodiment.

The execution control unit 13 inverts the bits of the output data (second output data) that is the processing result at Step S9 (Step S20). The execution control unit 13 writes the second output data having inverted bits in the second memory area 12B (Step S10). The execution control unit 13 rewrites the memory's own stored data stored in the second memory area 12B in accordance with the processing result at Step S9 and inverts the bits of the memory's own stored data.

The execution control unit 13 adds a redundancy code to the second output data written in the second memory area 12B (Step S11). The redundancy code is, for example, a CRC. The processes from Step S7 to Step S11 correspond to the second process for the second input data written in the second memory area 12B.

Next, the result collating unit 14 collates and compares the first output data to which the redundancy code is added at Step S6 and the second output data to which the redundancy code is added at Step S11 (Step S12). At Step S12, the result collating unit 14 collates the first output data and the second output data by using a method of exclusive-ORing the first output data with the second output data. The subsequent operation procedure from Step S13 to Step S15 is similar to the operation procedure from Step S13 to Step S15 in the first embodiment.

When it is determined by the redundancy check at Step S14 that there is no abnormality (No at Step S15), the safety output device 19 outputs the first output data. Next, the computation diagnosis unit 15 diagnoses the presence or absence of a failure in the processor 11 (Step S21). In contrast to the first output data stored in the first memory area 12A, the bits of the second output data stored in the second memory area 12B are inverted at Step S20. A failure in an address line can be detected by collating and comparing the first output data and the second output data. Therefore, in the second embodiment, it is not necessary that the computation diagnosis unit 15 perform a failure diagnosis on the memory 12.

The operation procedure at Step S17 and Step S18 is similar to the operation procedure at Step S17 and Step S18 in the first embodiment. In a similar manner to the first embodiment, the safety controller according to the second embodiment can realize simplification and low cost by using a simplex circuit configuration and can detect both a hardware failure and a software failure.

Third Embodiment

A safety controller according to a third embodiment has the same configuration as that of the safety controller (see FIG. 1) according to the first embodiment. In the operation procedure of the safety controller according to the present embodiment, complement conversion is performed instead of the bit inversion at Step S20 in the operation procedure of the safety controller according to the second embodiment (see FIG. 4 and FIG. 5). The operation procedure in the present embodiment will be explained with reference to the flowcharts in FIG. 4 and FIG. 5.

The execution control unit 13 converts the output data (second output data) that is the processing result at Step S9 into a complement. The execution control unit 13 writes the second output data converted into the complement in the second memory area 12B (Step S10). The execution control unit 13 rewrites the memory's own stored data stored in the second memory area 12B in accordance with the processing result at Step S9 and converts the memory's own stored data into a complement.

The result collating unit 14 collates and compares the first output data to which the redundancy code is added at Step S6 and the second output data to which the redundancy code is added at Step S11 (Step S12). At Step S12, the result collating unit 14 collates the first output data and the second output data by determining whether the sum of the first output data and the second output data is zero. The subsequent operation procedure is similar to the operation procedure from Step S13 to Step S18 in the second embodiment.

In the third embodiment, in a similar manner to the second embodiment, the value of the first output data written in the first memory area 12A and the value of the second output data written in the second memory area 12B are different from each other. A failure in an address line can be detected by collating and comparing the first output data and the second output data. Therefore, in the third embodiment, it is not necessary that the computation diagnosis unit 15 perform a failure diagnosis on the memory 12.

In a similar manner to the first and second embodiments, the safety controller according to the third embodiment can realize simplification and low cost by using a simplex circuit configuration and can detect both a hardware failure and a software failure.

Fourth Embodiment

A safety controller according to a fourth embodiment has the same configuration as that of the safety controller (see FIG. 1) according to the first embodiment. In the operation procedure of the safety controller according to the present embodiment, conversion of reversing the endian is performed instead of the bit inversion at Step S20 in the operation procedure of the safety controller according to the second embodiment (see FIG. 4 and FIG. 5). The operation procedure in the present embodiment will be explained with reference to the flowcharts in FIG. 4 and FIG. 5.

The execution control unit 13 performs conversion of, for example, reversing the upper bits and the lower bits of 16-bit data on the output data (second output data) that is the processing result at Step S9. The execution control unit 13 writes the second output data whose endian is reserved in the second memory area 12B (Step S10). The execution control unit 13 rewrites the memory's own stored data stored in the second memory area 12B in accordance with the processing result at Step S9 and reverses the endian of the memory's own stored data.

The result collating unit 14 collates and compares the first output data to which the redundancy code is added at Step S6 and the second output data to which the redundancy code is added at Step S11 (Step S12). At this point, the result collating unit 14 reads the second output data stored in the second memory area 12B after reversing its endian. The result collating unit 14 collates the first output data and the second output data whose endian is reversed. The subsequent operation procedure is similar to the operation procedure from Step S13 to Step S18 in the second embodiment.

In the fourth embodiment, in a similar manner to the second and third embodiments, the value of the first output data written in the first memory area 12A and the value of the second output data written in the second memory area 12B are different from each other. A failure in an address line can be detected by collating and comparing the first output data and the second output data. Therefore, in the fourth embodiment, it is not necessary that the computation diagnosis unit 15 perform a failure diagnosis on the memory 12.

In a similar manner to the first to third embodiments, the safety controller according to the fourth embodiment can realize simplification and low cost by using a simplex circuit configuration and can detect both a hardware failure and a software failure.

The safety controller according to the fourth embodiment may reverse the endian of the output data (first output data) that is the processing result at Step S4. When the result collating unit 14 performs collation and comparison, the result collating unit 14 may read any of the first output data stored in the first memory area 12A and the second output data stored in the second memory area 12B after reversing its endian.

Fifth Embodiment

A safety controller according to a fifth embodiment has the same configuration as that of the safety controller (see FIG. 1) according to the first embodiment. The operation procedure of the safety controller according to the present embodiment is similar to the operation procedure of the safety controller according to the first embodiment (see FIG. 2 and FIG. 3). The operation procedure in the present embodiment will be explained with reference to the flowcharts in FIG. 2 and FIG. 3.

In the program process (Step S4) performed on the first input data, the execution control unit 13 uses a program created as a 16-bit compiler. In contrast, in the program process (Step S9) performed on the second input data, the execution control unit 13 uses a program created as a 32-bit compiler.

Most pieces of data to be processed by the controller are 16-bit data. At Step S4, the execution control unit 13 loads 16-bit first input data in the register and executes a 16-bit instruction. The execution control unit 13 writes 16-bit first output data that is the processing result in the first memory area 12A (Step S5).

At Step S9, the processor 11 loads 16-bit second input data in the register and executes a 32-bit instruction. The execution control unit 13 writes 16-bit second output data that is the processing result in the second memory area 12B (Step S10).

In the fifth embodiment, the instruction to be performed on the first input data and the instruction to be performed on the second input data are different from each other. The result collating unit 14 can detect a software failure and a hardware failure in the processor 11 by collating and comparing the first output data and the second output data. Therefore, in the fifth embodiment, it is not necessary that the computation diagnosis unit 15 perform a failure diagnosis on the processor 11.

In a similar manner to the first to fourth embodiments, the safety controller according to the fifth embodiment can realize simplification and low cost by using a simplex circuit configuration and can detect both a hardware failure and a software failure.

Sixth Embodiment

Figure 6:
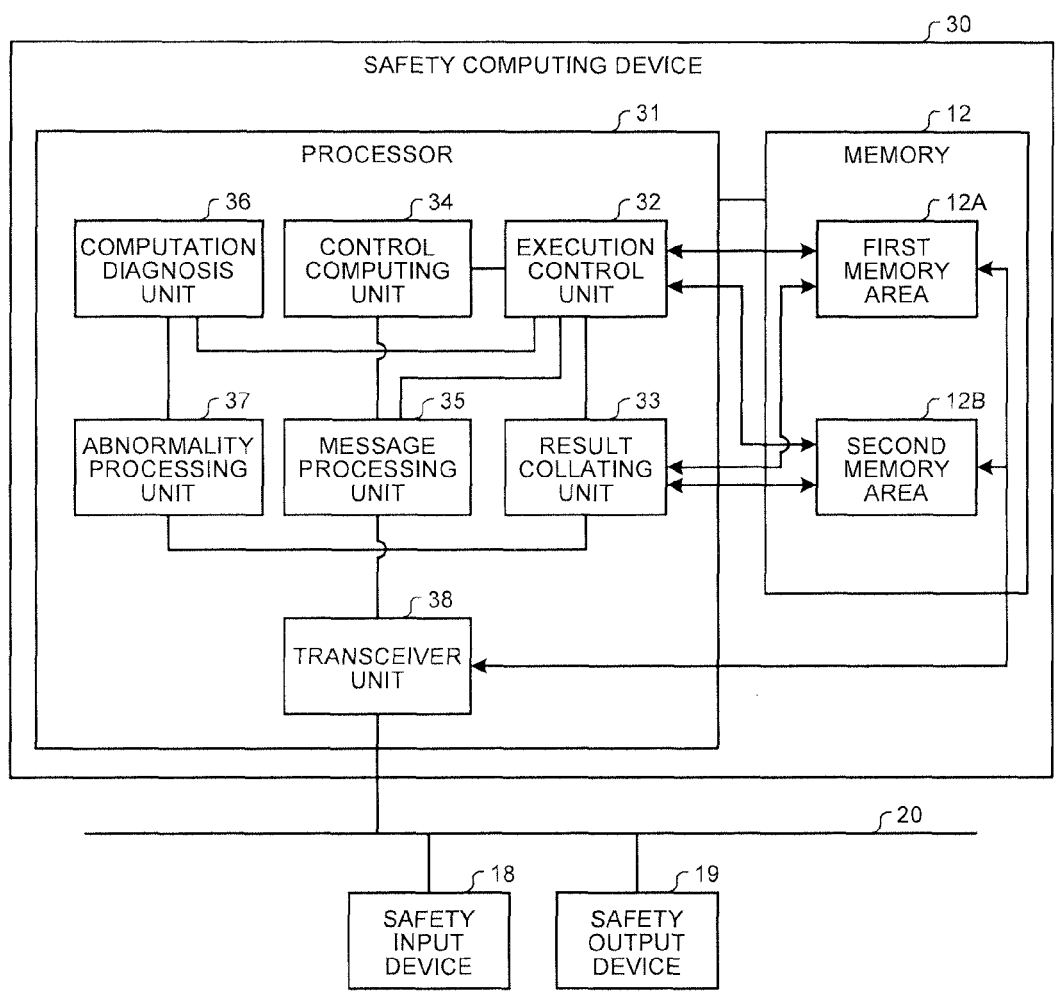
FIG. 6 is a block diagram illustrating the configuration of a safety controller that includes a safety computing device according to a sixth embodiment of the present invention.

FIG. 6 is a block diagram illustrating the configuration of a safety controller that includes a safety computing device according to a sixth embodiment of the present invention. The safety controller includes a safety computing device 30, the safety input device 18, and the safety output device 19. Components that are the same as those in the first embodiment are designated by the same reference numerals and redundant explanations will be appropriately omitted.

The safety computing device 30 performs a computation process for safety control. The safety computing device 30, the safety input device 18, and the safety output device 19 are internally connected to each other via the bus 20. The safety input device 18 calculates a redundancy code on the basis of the input data to be input to the safety controller. The safety input device 18 generates an input message in which a redundancy code and additional information are added to the input data. The input message includes input data and a redundancy code. The redundancy code is, for example, a CRC. The additional information is, for example, header information.

The safety computing device 30 includes a processor 31 and the memory 12. The processor 31 performs a program process on the input data input to the safety computing device 30. The memory 12 stores input messages to be input to the processor 31 and output messages that are the results of the program process.

The processor 31 includes an execution control unit 32, a result collating unit 33, a control computing unit 34, a message processing unit 35, a computation diagnosis unit 36, an abnormality processing unit 37, and a transceiver unit 38. The transceiver unit 38 receives input messages from the safety input device 18 and transmits output messages to the safety output device 19. The transceiver unit 38 transfers input messages between the safety input device 18 and the first memory area 12A and the second memory area 12B and transfers output messages between the safety output device 19 and the first memory area 12A and the second memory area 12B.

The message processing unit 35 performs an input message process and an output message process. In the input message process, the message processing unit 35 decodes and checks the redundancy code added to input messages. In the output message process, the message processing unit 35 generates output messages by adding a redundancy code to output data.

The control computing unit 34 performs control computation on the input data included in the input message from the message processing unit 35. The control computing unit 34, for example, executes safety control logic. The execution control unit 32 performs a first process on the input messages written in the first memory area 12A and a second process on the input messages written in the second memory area 12B.

The result collating unit 33 collates the output message written in the first memory area 12A in the first process and the output message written in the second memory area 12B in the second process.

The computation diagnosis unit 36 diagnoses, by computation, the presence or absence of a failure in the processor 31 and the memory 12. The computation diagnosis unit 36 diagnoses the processor 31 and the memory 12 by using, for example, a test pattern.

When an abnormality is detected by at least one of the redundancy check performed on input data and output data, the collation performed by the result collating unit 33, and the diagnosis performed by the computation diagnosis unit 36, the abnormality processing unit 37 stops outputting output messages.

Next, the operation procedure of the safety controller will be explained. The transceiver unit 38 reads an input message in which a redundancy code is added to the input data from the safety input device 18. The transceiver unit 38 writes the read input message in the first memory area 12A and the second memory area 12B.

The message processing unit 35 performs the input message process on the input message read by the transceiver unit 38. In the first process, the message processing unit 35 decodes the redundancy code added to the input message and performs a redundancy check. The message processing unit 35 checks the input data and the header information included in the input message. The execution control unit 32 writes the input message on which the input message process is performed by the message processing unit 35 in the first memory area 12A.

In the first process, the execution control unit 32 sends the input message read from the first memory area 12A to the control computing unit 34. The control computing unit 34 performs the control computation, for example, safety control logic, on the input data included in the input message. The execution control unit 32 writes the input data on which the control computation is performed by the control computing unit 34 in the first memory area 12A as output data.

In the first process, the execution control unit 32 sends the output data read from the first memory area 12A to the message processing unit 35. The message processing unit 35 performs the output message process on the output data read from the first memory area 12A. The message processing unit 35 calculates a redundancy code on the basis of the output data and adds the redundancy code to the output data. The execution control unit 32 writes the output data to which the redundancy code is added in the first memory area 12A as an output message. In the first process, the execution control unit 32 performs the input message process, the control computation, and the output message process, and records the results in the first memory area 12A as needed.

Next, in the second process, the message processing unit 35 decodes the redundancy code added to the input message and performs a redundancy check. The message processing unit 35 checks the input data and the header information included in the input message. The execution control unit 32 writes the input message on which the input message process is performed by the message processing unit 35 in the second memory area 12B.

In the second process, the execution control unit 32 sends the input message read from the second memory area 12B to the control computing unit 34. The control computing unit 34 performs the control computation, for example, safety control logic, on the input data included in the input message. The execution control unit 32 writes the input data on which the control computation is performed by the control computing unit 34 in the second memory area 12B as output data.

In the second process, the execution control unit 32 sends the output data read from the second memory area 12B to the message processing unit 35. The message processing unit 35 performs the output message process on the output data read from the second memory area 12B. The message processing unit 35 calculates a redundancy code on the basis of the output data. The message processing unit 35 generates an output message in which the redundancy code is added to the output data. The execution control unit 32 writes the output message generated in the message processing unit 35 in the second memory area 12B. In the second process, the execution control unit 32 performs the input message process, the control computation, and the output message process, and records the results in the second memory area 12B as needed.

The result collating unit 33 collates and compares the output message written in the first memory area 12A and the output message written in the second memory area 12B. When an abnormality is detected by at least one of the redundancy check performed on input data and output data, the collation performed by the result collating unit 33, and the diagnosis performed by the computation diagnosis unit 36, the abnormality processing unit 37 stops outputting output messages.

In the sixth embodiment, in a similar manner to the first embodiment, the safety controller can realize simplification and low cost by using a simplex circuit configuration.

Seventh Embodiment

Figure 7:
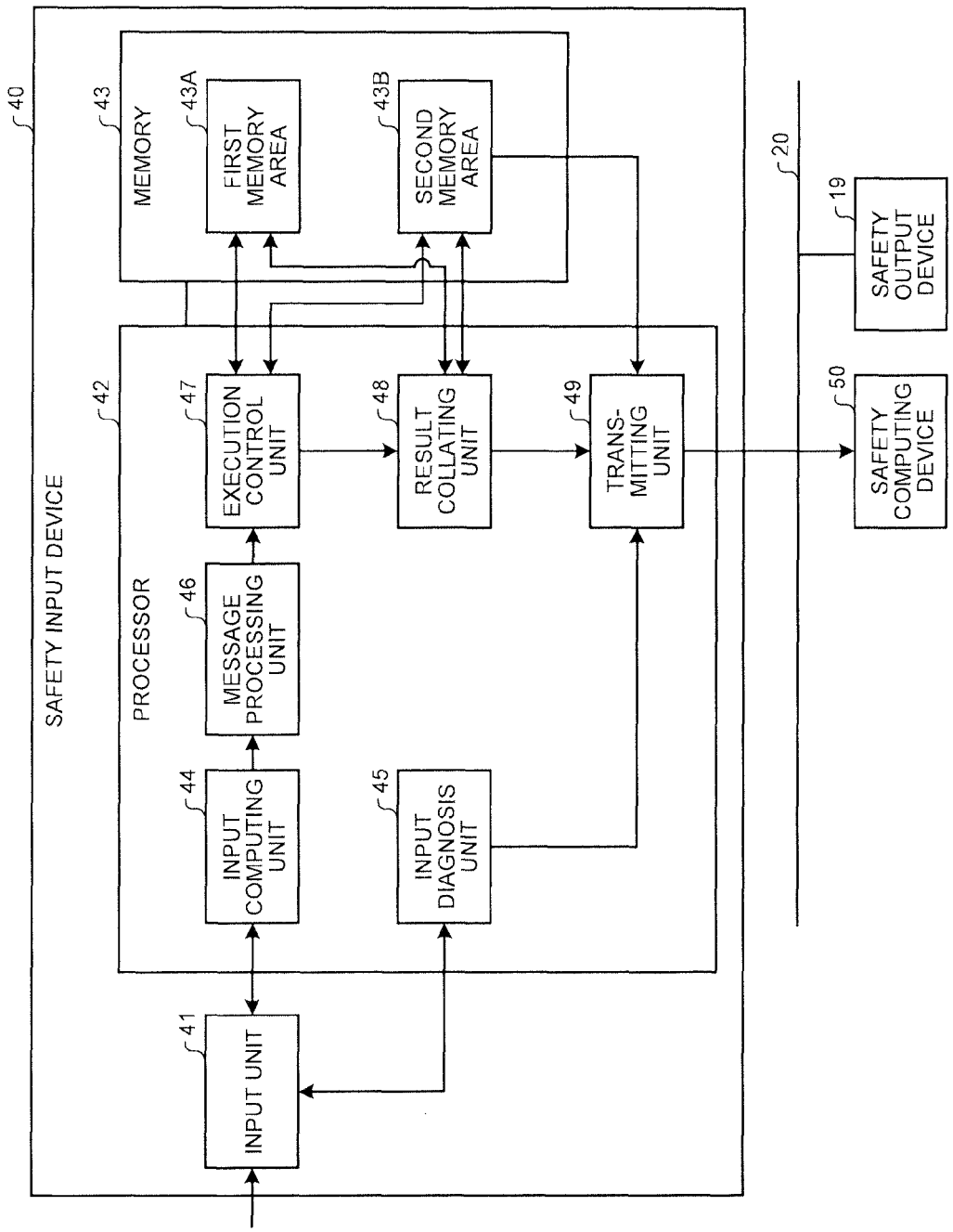
FIG. 7 is a block diagram illustrating the configuration of a safety controller that includes a safety input device according to a seventh embodiment of the present invention.

FIG. 7 is a block diagram illustrating the configuration of a safety controller that includes a safety input device according to a seventh embodiment of the present invention. The safety controller includes a safety input device 40, a safety computing device 50, and the safety output device 19.

The safety computing device 50 performs a computation process for safety control. The safety input device 40 receives an input of input signals to the safety controller. The safety output device 19 outputs output signals to external destinations from the safety controller. The safety input device 40, the safety computing device 50, and the safety output device 19 are internally connected to each other via the bus 20.

The safety input device 40 includes an input unit 41, a processor 42, and a memory 43. The input unit 41 digitalizes an input signal to the safety input device 40 to obtain input data. The processor 42 performs a program process on the input data from the input unit 41. The memory 43 stores input data to be input to the processor 42.

The memory 43 includes a first memory area 43A and a second memory area 43B, which are independent from each other. The second memory area 43B has addresses that are different from those of the first memory area 43A. Both the first memory area 43A and the second memory area 43B can store input data.

The processor 42 includes an input computing unit 44, an input diagnosis unit 45, a message processing unit 46, an execution control unit 47, a result collating unit 48, and a transmitting unit 49. The input computing unit 44 performs a computation process on the input data from the input unit 41. The input diagnosis unit 45 diagnoses the presence or absence of an abnormality in the input unit 41 by transmitting a test signal to the input unit 41.

In an input message process, the message processing unit 46 adds a redundancy code and additional information to input data. Whereby, the message processing unit 46 generates an input message for the safety computing device 50.

The execution control unit 47 performs a first process that includes writing of input messages into the first memory area 43A and a second process that includes writing of input messages into the second memory area 43B.

The result collating unit 48 collates the input message written in the first memory area 43A in the first process and the input message written in the second memory area 43B in the second process.

The transmitting unit 49 transmits any of the input message written in the first memory area 43A and the input message written in the second memory area 43B to the safety computing device 50.

Figure 8:
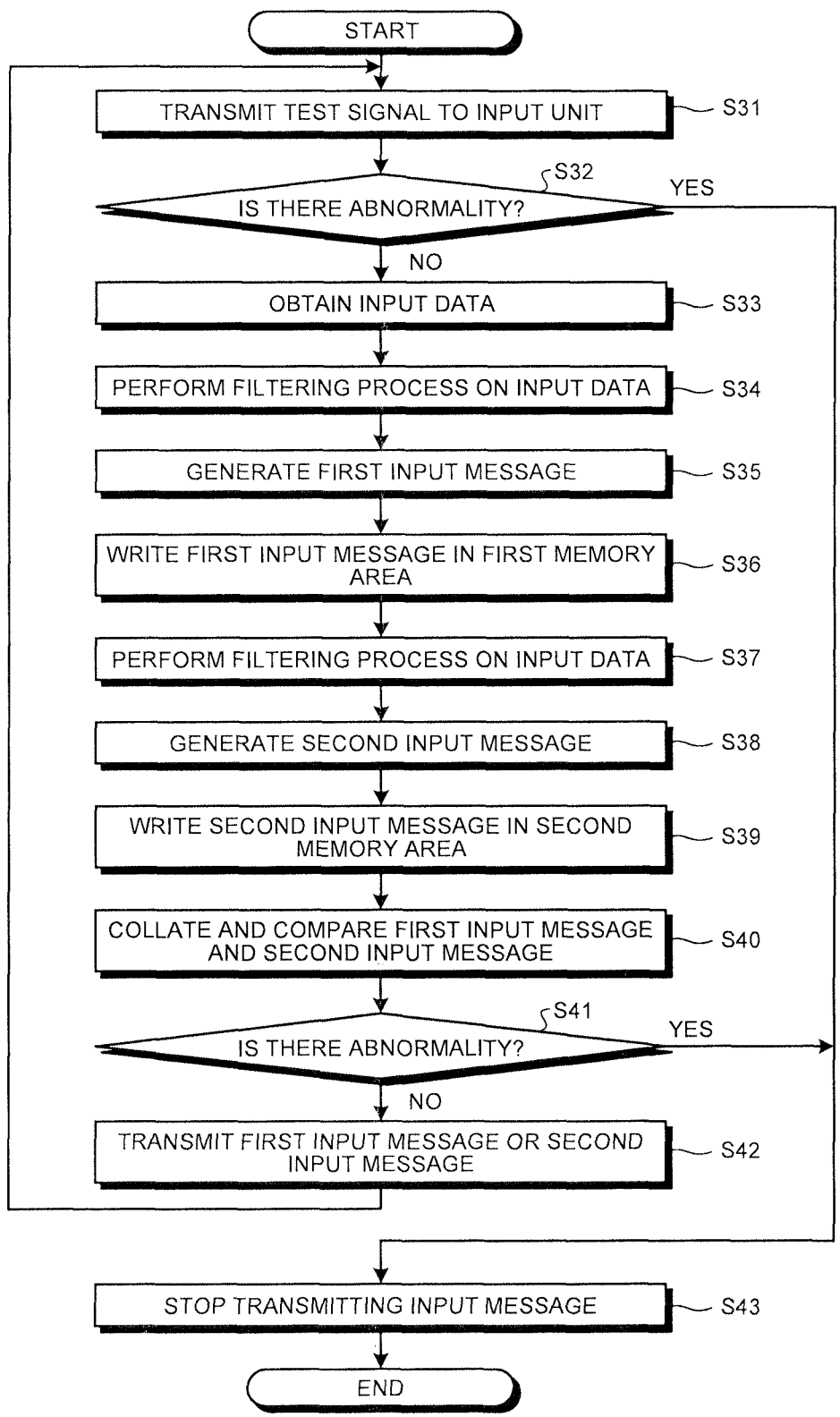
FIG. 8 is a flowchart illustrating an operation procedure of the safety input device.

FIG. 8 is a flowchart illustrating the operation procedure of the safety input device. The input diagnosis unit 45 transmits a test signal to the input unit 41 (Step S31). The input diagnosis unit 45 determines the presence or absence of an abnormality in the input unit 41 (Step S32).

The input diagnosis unit 45 checks whether the value of the input data matches the test signal in the input unit 41. When the input signal is a digital signal, the input diagnosis unit 45 uses, as a test signal, a signal obtained by inverting ON/OFF of the current value of the input data. For example, when the value of a corresponding input channel is "ON", the input diagnosis unit 45 transmits an OFF signal as a test signal. When the input computing unit 44 recognizes the OFF signal, the input diagnosis unit 45 determines that there is no abnormality in the input unit 41. When the value of a corresponding input channel is "OFF", the input diagnosis unit 45 may transmit an ON signal as a test signal.

When the input signal is an analog signal, the input diagnosis unit 45 uses, as a test signal, a waveform that fluctuates within the width range of the analog input. When the input computing unit 44 recognizes the waveform of the test signal, the input diagnosis unit 45 determines that there is no abnormality in the input unit 41. The input diagnosis unit 45 may transmit the value within the range of the analog input to the input unit 41 in a divided manner a plurality of times. When the input computing unit 44 recognizes these values, the input diagnosis unit 45 determines that there is no abnormality in the input unit 41. The input diagnosis unit 45 selects a test signal such that each bit can be checked as to whether it is ON/OFF after AD conversion.

When the input diagnosis unit 45 determines that there is an abnormality in the input unit 41 (Yes at Step S32), the transmitting unit 49 stops transmitting input messages to the safety computing device 50 (Step S43). The safety controller stops the operation.

When the input diagnosis unit 45 determines that there is no abnormality in the input unit 41 (No at Step S32), the input unit 41 samples signals from a plurality of input terminals and digitalizes them. The input unit 41 obtains the digitalized input data (Step S33). The input computing unit 44 performs a filtering process on the input data for each input channel of the input unit 41 (Step S34). The input computing unit 44 determines the value (input value) of the input data to be passed through the filtering process.

In the case where the input signal is a digital signal, when the input signal within a predetermined cycle takes the same value, the input computing unit 44 determines this value as an input value. Alternatively, the input computing unit 44 determines, as an input value, the most frequent value among the values of the input signal within a predetermined cycle. When the input signal is an analog signal, the input computing unit 44 determines, as an input value, the moving average of the input signal within a predetermined cycle. The input computing unit 44 may determine an input value after removing values that change suddenly within a predetermined cycle of the input signal.

The message processing unit 46 adds a redundancy code and additional information to the input data from the input computing unit 44. The redundancy code is, for example, a CRC. The additional information is, for example, header information. The message processing unit 46 generates an input message (first input message) in which the redundancy code and the header information are added to the input data (Step S35).

The message processing unit 46 adds, as header information, transceiver station information and the message number to the communication header of the input data. The message processing unit 46 calculates a CRC for the header information and the payload (input data). The message processing unit 46 adds the calculated CRC to the payload.

The safety computing device 50 can detect a bit error in the input message by recalculating the CRC. The safety computing device 50 can determine whether the received input message is an input message that should be received by checking the header information.

The execution control unit 47 writes the first input message from the message processing unit 46 in the first memory area 43A (Step S36). The first process is the process from Step S33 to Step S35. The first memory area 43A also functions as a storage area for variables and the like during the first process other than storing the first input message.

Next, in a similar manner to Step S34, the input computing unit 44 performs a filtering process on the input data for each input channel of the input unit 41 (Step S37). In a similar manner to Step S35, the message processing unit 46 adds a redundancy code and header information to the input data from the input computing unit 44. The message processing unit 46 generates an input message (second input message) in which the redundancy code and the header information are added to the input data (Step S38).

The execution control unit 47 writes the second input message from the message processing unit 46 in the second memory area 43B (Step S39). The second process is the process from Step S37 to Step S39. The second memory area 43B also functions as a storage area for variables and the like during the second process other than storing the second input message.

The result collating unit 48 reads the first input message from the first memory area 43A. The result collating unit 48 reads the second input message from the second memory area 43B. The result collating unit 48 collates and compares the read first input message and the read second input message (Step S40).

When an abnormality is detected by the collation performed by the result collating unit 48 (Yes at Step S41), the transmitting unit 49 stops transmitting input messages to the safety computing device 50 (Step S43). The safety controller stops the operation.

When it is determined by the collation performed by the result collating unit 48 that there is no abnormality (No at Step S41), the transmitting unit 49 transmits the first input message or the second input message to the safety computing device 50 (Step S42). For example, the transmitting unit 49 reads the second input message from the second memory area 43B. The transmitting unit 49 transmits the read second input message to the safety computing device 50. When the input message is transmitted from the transmitting unit 49 to the safety computing device 50, the safety input device 40 returns to Step S31 and continues the operation for receiving an input of input signals for the safety controller.

When a software failure occurs in any of the processor 42 and the memory 43, the safety input device 40 can detect the occurrence of the failure from the collation result obtained by the result collating unit 48. When there is a software failure, the safety input device 40 may continue the operation after performing a predetermined process other than stopping the operation.

Even if a software failure is detected in a certain cycle in a software process, the software failure may be eliminated in the next and subsequent cycles. Therefore, for example, the safety input device 40 may use, for a cycle in which a failure was detected, an input message in a cycle immediately before the cycle in which the failure was detected so that it is not determined that an error has occurred and the safety input device 40 may continue the process in the next and subsequent cycles. When the safety input device 40 detects a failure continuously for a predetermined number of cycles, the safety input device 40 may stop the operation.

In the safety input device 40, when a hardware failure occurs in any of the processor 42 and the memory 43, it is difficult to detect the occurrence of the failure by the result collating unit 48 performing a collation. Therefore, the safety input device 40 performs, for example, a predetermined diagnostic program in the middle of a cycle in order to self-diagnose a hardware failure.

The safety input device 40 performs a diagnosis by using the input diagnosis unit 45 over the entire range of the input signal to be input to the input unit 41. For the input unit 41 having a simplex circuit configuration, the safety input device 40 can detect erroneous input due to a circuit component being stuck and the occurrence of drift. The safety input device 40 and the safety computing device 50 can detect an error in an input message with a simplex communication unit by performing a redundancy check on the input message and checking the header information. The safety input device 40 can prevent the introduction of a software error by collating input messages in the result collating unit 48.

The safety input device 40 uses a simplex circuit configuration configured from the input unit 41, the processor 42, and the memory 43. The safety input device 40 according to the seventh embodiment can realize simplification and low cost with a simplex circuit configuration and can detect both a hardware failure and a software failure.

An operation similar to that of the processor 11 (see FIG. 1) in the first to fifth embodiments described above may be added to the operation of the processor 42 of the safety input device 40.

Eighth Embodiment

Figure 9:
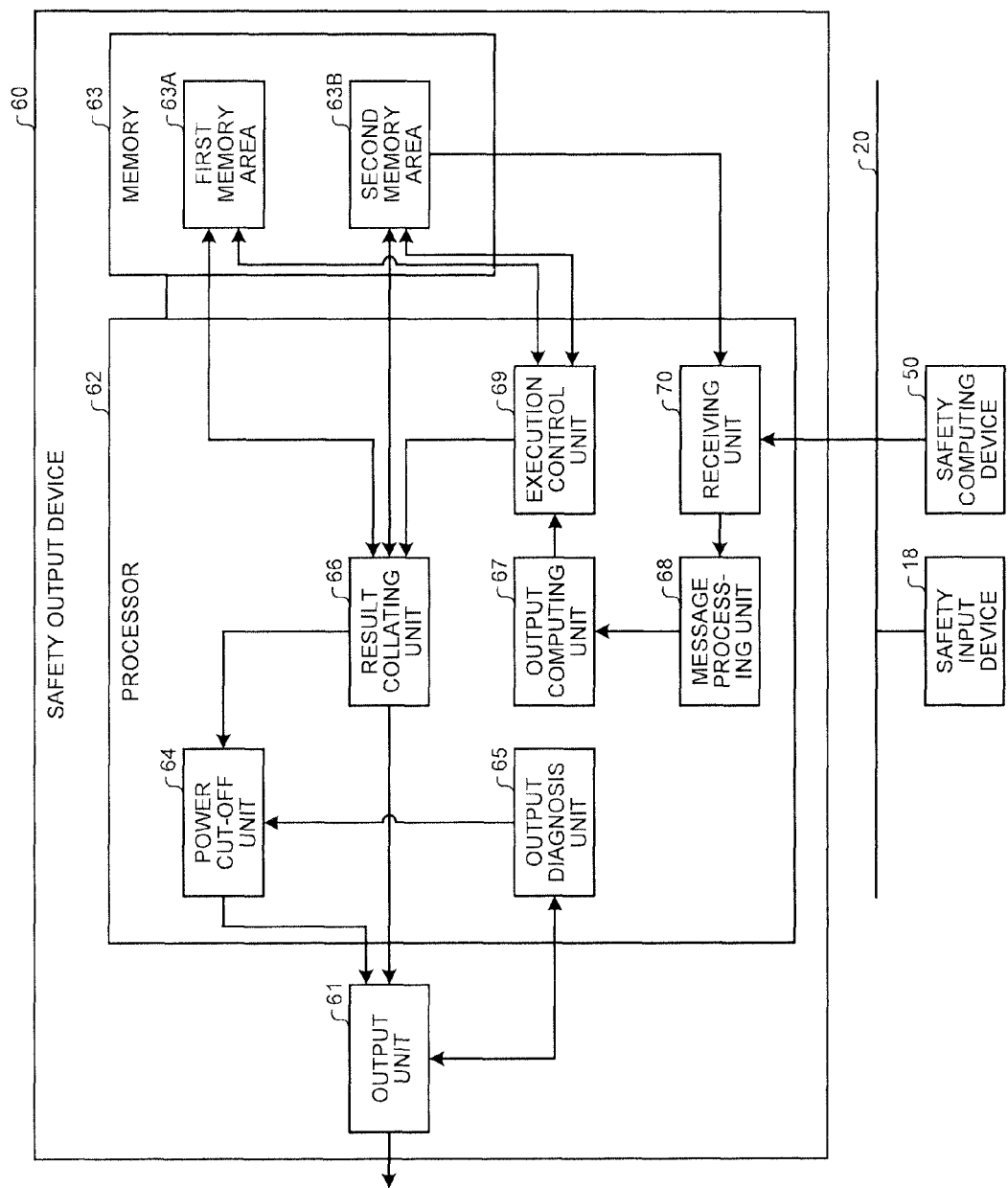
FIG. 9 is a block diagram illustrating the configuration of a safety controller that includes a safety output device according to an eighth embodiment of the present invention.

FIG. 9 is a block diagram illustrating the configuration of a safety controller that includes a safety output device according to an eighth embodiment of the present invention. The safety controller includes the safety input device 18, the safety computing device 50, and a safety output device 60.

The safety computing device 50 performs a computation process for safety control. The safety input device 18 receives an input of input signals to the safety controller. The safety output device 60 outputs output signals to external destinations from the safety controller. The safety input device 18, the safety computing device 50, and the safety output device 60 are internally connected to each other via the bus 20.

The safety output device 60 includes an output unit 61, a processor 62, and a memory 63. The processor 62 performs a program process on output messages. The memory 63 stores output data included in the output messages. The output unit 61 outputs output signals in accordance with output data.

The memory 63 includes a first memory area 63A and a second memory area 63B, which are dependent from each other. The second memory area 63B has addresses that are different from those of the first memory area 63A. Both the first memory area 63A and the second memory area 63B can store output data.

The processor 62 includes a power cut-off unit 64, an output diagnosis unit 65, a result collating unit 66, an output computing unit 67, a message processing unit 68, an execution control unit 69, and a receiving unit 70. The receiving unit 70 receives output messages from the safety computing device 50.

The message processing unit 68 checks, as an output message process, the content of an output message on the basis of the redundancy code and the additional information included in the output message. The output computing unit 67 performs a computation process for retrieving output data from an output message. The execution control unit 69 performs a first process that includes writing of output data into the first memory area 63A and a second process that includes writing of output data into the second memory area 63B.

The result collating unit 66 collates the output data written in the first memory area 63A in the first process and the output data written in the second memory area 63B in the second process.

The output diagnosis unit 65 diagnoses the presence or absence of an abnormality in the output unit 61 by transmitting a test signal to the output unit 61. The power cut-off unit 64 cuts off the power to the output unit 61 in accordance with the diagnosis result obtained by the output diagnosis unit 65.

Figure 10:
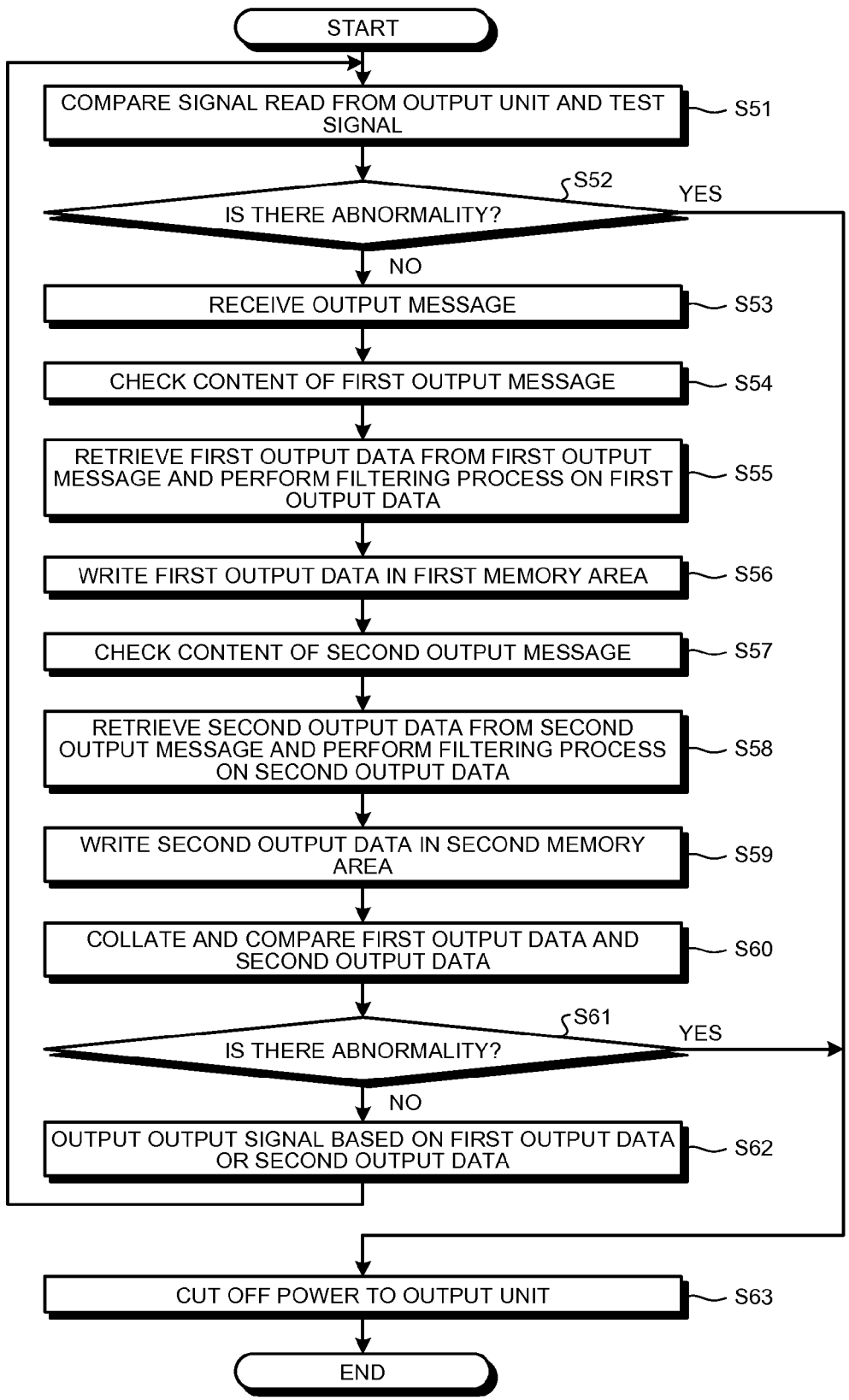
FIG. 10 is a flowchart illustrating an operation procedure of the safety output device.

FIG. 10 is a flowchart illustrating the operation procedure of the safety output device. The output diagnosis unit 65 transmits a test signal to the output unit 61 (Step S51). The output diagnosis unit 65 determines the presence or absence of an abnormality in the output unit 61 (Step S52).

The output diagnosis unit 65 checks whether the value of the output data matches the test signal in the output unit 61. When the output signal is a digital signal, the output diagnosis unit 65 uses, as a test signal, a signal obtained by inverting ON/OFF of the current value of the output data. The output diagnosis unit 65 outputs the test signal to the output unit 61.

For example, when the value of a corresponding output terminal is "ON", the output diagnosis unit 65 transmits an OFF signal as a test signal. When the output diagnosis unit 65 recognizes the OFF signal within a certain period of time, the output diagnosis unit 65 determines that there is no abnormality in the output unit 61. Alternatively, the output diagnosis unit 65 reads a signal from an output terminal and compares the value of the read signal and the value of the expected output data.

When the output signal is an analog signal, the output diagnosis unit 65 transmits the value in the range of the DA converter to the output unit 61 in a divided manner a plurality of times. When the output diagnosis unit 65 reads the value of the output data of the output unit 61 and the read value is within the error range, the output diagnosis unit 65 determines that there is no abnormality in the output unit 61. The output diagnosis unit 65 performs the test within a short enough period of time that the devices connected to the output terminal do not respond. During the test performed by the output diagnosis unit 65, the output unit 61 may continue to output the output signal based on the current output data.

When the output diagnosis unit 65 determines that there is an abnormality in the output unit 61 (Yes in Step S52), the power cut-off unit 64 cuts off the power to the output unit 61 (Step S63). The safety output device 60 forces the output signal from the output unit 61 to zero by cutting off the power to the output unit 61.

When the output diagnosis unit 65 determines that there is no abnormality in the output unit 61 (No at Step S52), the receiving unit 70 receives an output message from the safety computing device 50 (Step S53). The message processing unit 68 checks the content of the output message (first output message) received by the receiving unit 70 (Step S54).

The output message includes a redundancy code and additional information. The redundancy code is, for example, a CRC. The additional information is, for example, header information. The message processing unit 68 detects a bit error in the first output message by recalculating the CRC of the first output message. The message processing unit 68 determines whether the received first output message is a correct output message from which the safety output device 60 should obtain an output signal by checking transceiver station information and the message number that are header information.

The output computing unit 67 retrieves output data (first output data) for each output terminal of the output unit 61 from the first output message. The output computing unit 67 performs a filtering process on the first output data (Step S55). The output computing unit 67 determines, as a value (output value) of the first output data that is to be passed through the filtering process, the moving average within a predetermined cycle or a continuous same value. The output computing unit 67 prevents fluctuations of the output value by performing the filtering process.

The execution control unit 69 writes the first output data from the output computing unit 67 in the first memory area 63A (Step S56). The first process is the process from Step S54 to Step S56. The first memory area 63A also functions as a storage area for variables and the like during the first process other than storing the first output data.

Next, in a similar manner to Step S54, the message processing unit 68 checks the content of the output message (second output message) received by the receiving unit 70 (Step S57). The message processing unit 68 detects a bit error in the second output message by recalculating the CRC of the second output message. The message processing unit 68 determines whether the received second output message is a correct output message from which the safety output device 60 should obtain an output signal by checking transceiver station information and the message number that are header information.

In a similar manner to Step S55, the output computing unit 67 retrieves output data (second output data) for each output terminal of the output unit 61 from the second output message. The output computing unit 67 performs a filtering process on the second output data (Step S58).

The execution control unit 69 writes the second output data from the output computing unit 67 in the second memory area 63B (Step S59). The second process is the process from Step S57 to Step S59. The second memory area 63B also functions as a storage area for variables and the like during the second process other than storing the second output data.

The result collating unit 66 reads the first output data from the first memory area 63A. The result collating unit 66 reads the second output data from the second memory area 63B. The result collating unit 66 collates and compares the read first output data and the read second output data (Step S60).

When an abnormality is detected by the collation performed by the result collating unit 66 (Yes in Step S61), the power cut-off unit 64 cuts off the power to the output unit 61 (Step S63). The safety output device 60 forces the output signal from the output unit 61 to zero by cutting off the power to the output unit 61.

When it is determined by the collation performed by the result collating unit 66 that there is no abnormality (No in Step S61), the output unit 61 outputs an output signal based on the first output data or the second output data (Step S62). When the output unit 61 outputs the output signal, the safety output device 60 returns to Step S51 and continues the operation for outputting an output signal.

When a software failure occurs in any of the processor 62 and the memory 63, the safety output device 60 can detect the occurrence of the failure from the collation result obtained by the result collating unit 66. When there is a software failure, the safety output device 60 may continue the operation after performing a predetermined process other than stopping the operation.

Even if a software failure is detected in a certain cycle in a software process, the software failure may be eliminated in the next and subsequent cycles. Therefore, for example, the safety output device 60 may use, for a cycle in which a failure was detected, output data in a cycle immediately before the cycle in which the failure was detected so that it is not determined that an error has occurred and the safety output device 60 may continue the process in the next and subsequent cycles. When the safety output device 60 detects a failure continuously for a predetermined number of cycles, the safety output device 60 may stop the operation.

In the safety output device 60, when a hardware failure occurs in any of the processor 62 and the memory 63, it is difficult to detect the occurrence of the failure by the result collating unit 66 performing a collation. Therefore, the safety output device 60 performs, for example, a predetermined diagnostic program in the middle of a cycle in order to self-diagnose a hardware failure.

The safety output device 60 performs a diagnosis by using the output diagnosis unit 65 over the entire output range of the output unit 61. For the output unit 61 having a simplex circuit configuration, the safety output device 60 can detect erroneous output due to a circuit component being stuck and the occurrence of drift. The safety output device 60 and the safety computing device 50 can detect an error in an output message with a simplex communication unit by performing a redundancy check on the output message and checking the header information. The safety output device 60 can prevent the introduction of a software error by collating the output data in the result collating unit 66.

The safety output device 60 uses a simplex circuit configuration configured from the output unit 61, the processor 62, and the memory 63. The safety output device 60 according to the eighth embodiment can realize simplification and low cost with a simplex circuit configuration and can detect both a hardware failure and a software failure.

An operation similar to that of the processor 11 (see FIG. 1) in the first to fifth embodiments described above may be added to the operation of the processor 62 of the safety output device 60.

Ninth Embodiment

Figure 11:
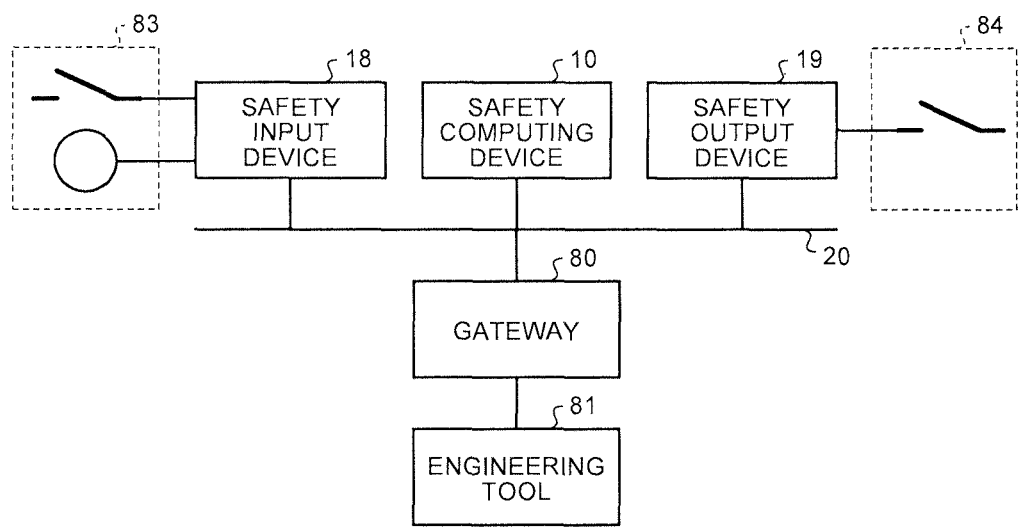
FIG. 11 is a block diagram illustrating the configuration of a safety controller according to a ninth embodiment of the present invention.

FIG. 11 is a block diagram illustrating the configuration of a safety controller according to a ninth embodiment of the present invention. The safety controller includes the safety input device 18, the safety computing device 10, the safety output device 19, a gateway 80, and an engineering tool 81. The safety computing device 10 is, for example, the safety computing device 10 according to the first embodiment.

The engineering tool 81 is, for example, a tool that edits a sequence program to be run on a PLC system or the like. The engineering tool 81 is, for example, realized in a personal computer in which engineering tool software is installed.

The safety computing device 10, the safety input device 18, and the safety output device 19 are internally connected to each other via the bus 20. The engineering tool 81 is connected to the bus 20 via the gateway 80. Switch and sensor 83 are connected to the input unit of the safety input device 18. Actuator and contactor 84 are connected to the output unit of the safety output device 19.

The engineering tool 81 changes or writes the safety control program and the configuration parameters of the safety computing device 10. The safety computing device 10 is used in the safety controller; therefore, the safety controller can detect both a hardware failure and a software failure without using a duplex hardware structure. The safety controller can realize simplification and low cost by using a simplex circuit configuration.

An operation similar to that of the safety controller according to the second to fifth embodiments described above may be added to the operation of the safety controller. The safety computing device 30 (see FIG. 6) according to the sixth embodiment may be used in the safety controller.

The safety input device 40 (see FIG. 7) according to the seventh embodiment may be used in the safety controller. In such a case, the engineering tool 81 specifies, for the safety input device 40, conditions for performing a filtering process on input data and conditions for input diagnosis. Even in such a case, the safety controller can realize simplification and low cost by using a simplex circuit configuration.

The safety output device 60 (see FIG. 9) according to the eighth embodiment may be used in the safety controller. In such a case, the engineering tool 81 specifies, for the safety output device 60, conditions for performing a filtering process on output data and conditions for output diagnosis. Even in such a case, the safety controller can realize simplification and low cost by using a simplex circuit configuration.

For example, the safety controller may be a combination of the safety computing device 30 according to the sixth embodiment, the safety input device 40 according to the seventh embodiment, and the safety output device 60 according to the eighth embodiment.

Tenth Embodiment

Figure 12:
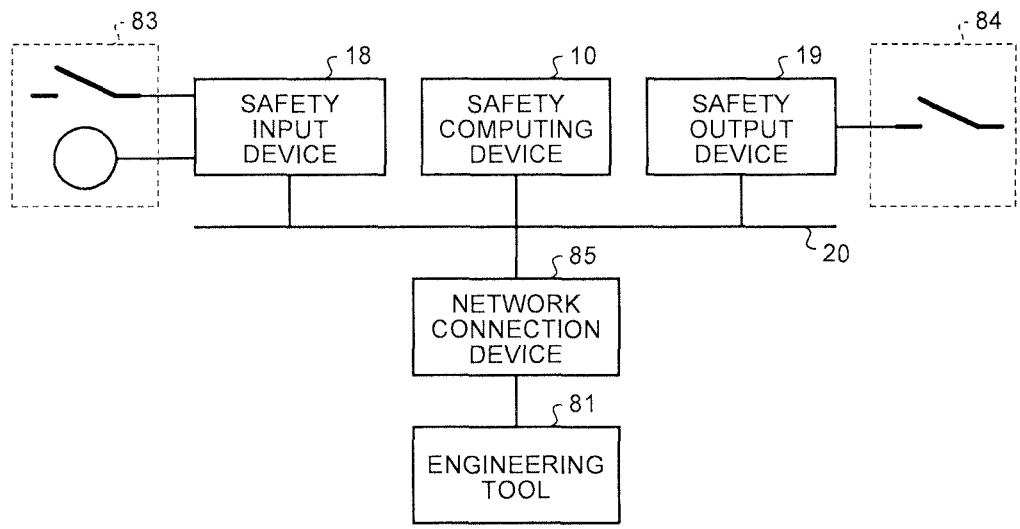
FIG. 12 is a block diagram illustrating the configuration of a safety controller according to a tenth embodiment of the present invention.

FIG. 12 is a block diagram illustrating the configuration of a safety controller according to a tenth embodiment of the present invention. Components that are the same as those in the ninth embodiment are designated by the same reference numerals and redundant explanations will be appropriately omitted.

The safety controller includes the safety input device 18, the safety computing device 10, the safety output device 19, a network connection device 85, and the engineering tool 81. The safety computing device 10 is, for example, the safety computing device 10 according to the first embodiment. The safety computing device 10, the safety input device 18, the safety output device 19, and the engineering tool 81 are connected to each other via the network connection device 85.

The engineering tool 81 changes or writes the safety control program and the configuration parameters of the safety computing device 10. The safety computing device 10 is used in the safety controller; therefore, the safety controller can detect both a hardware failure and a software failure without using a duplex hardware structure. The safety controller can realize simplification and low cost by using a simplex circuit configuration.

An operation similar to that of the safety controller according to the second to fifth embodiments described above may be added to the operation of the safety controller. The safety computing device 30 (see FIG. 6) according to the sixth embodiment may be used in the safety controller.

The safety input device 40 (see FIG. 7) according to the seventh embodiment may be used in the safety controller. In such a case, the engineering tool 81 specifies, for the safety input device 40, conditions for performing a filtering process on input data and conditions for input diagnosis. Even in such a case, the safety controller can realize simplification and low cost by using a simplex circuit configuration.

The safety output device 60 (see FIG. 9) according to the eighth embodiment may be used in the safety controller. In such a case, the engineering tool 81 specifies, for the safety output device 60, conditions for performing a filtering process on output data and conditions for output diagnosis. Even in such a case, the safety controller can realize simplification and low cost by using a simplex circuit configuration.

For example, the safety controller may be a combination of the safety computing device 30 according to the sixth embodiment, the safety input device 40 according to the seventh embodiment, and the safety output device 60 according to the eighth embodiment.

INDUSTRIAL APPLICABILITY

The safety controller according to the present invention is useful as a safety controller that is in charge of safety control of machines and facilities.

REFERENCE SIGNS LIST

11 processor, 12 memory, 12A first memory area, 12B second memory area, 13 execution control unit, 14 result collating unit, 15 computation diagnosis unit, 16 abnormality processing unit, 17 input/output processing unit, 18 safety input device, 19 safety output device, 20 bus, 30 safety computing device, 31 processor, 32 execution control unit, 33 result collating unit, 34 control computing unit, 35 message processing unit, 36 computation diagnosis unit, 37 abnormality processing unit, transceiver unit, 40 safety input device, 41 input unit, 42 processor, 43 memory, 43A first memory area, 43B second memory area, 44 input computing unit, 45 input diagnosis unit, 46 message processing unit, 47 execution control unit, 48 result collating unit, 49 transmitting unit, 50 safety computing device, 60 safety output device, 61 output unit, 62 processor, 63 memory, 63A first memory area, 63B second memory area, 64 power cut-off unit, 65 output diagnosis unit, 66 result collating unit, 67 output computing unit, 68 message processing unit, 69 execution control unit, 70 receiving unit, 80 gateway, 81 engineering tool, 83 switch and sensor, 84 actuator and contactor, 85 network connection device.

The invention claimed is:

1. A safety computing device comprising:
   a processor that executes a program process on input data; and
   a memory that stores the input data input to the processor and output data that is a result of the program process, wherein
   the memory is capable of storing the input data and the output data in each of a first memory area and a second memory area having an address different from an address of the first memory area, and
   the processor includes
   an execution control unit that performs a first process, which includes a redundancy check and the program process performed on the input data written in the first memory area and addition of a redundancy code to the output data that is a result of the program process and is written in the first memory area, and a second process, which includes a redundancy check and the program process performed on the input data written in the second memory area and addition of a redundancy code to the output data that is a result of the program process and is written in the second memory area,
   a result collating unit that collates the output data to which the redundancy code is added in the first process and the output data to which the redundancy code is added in the second process,
   a computation diagnosis unit that diagnoses, by computation, presence or absence of a failure in the processor and the memory, and
   an abnormality processing unit that, when an abnormality is detected by at least the redundancy check being performed on the input data by the execution control unit, stops outputting the output data.

2. The safety computing device according to claim 1, wherein
   in the second process, the execution control unit writes the output data having an inverted bit in the second memory area, and
   the result collating unit collates the output data read from the first memory area and the output data read from the second memory area by exclusive-ORing the output data read from the first memory area and the output data read from the second memory area.

3. The safety computing device according to claim 1, wherein in the second process, the execution control unit writes the output data on which complement conversion is performed in the second memory area, and the result collating unit collates the output data read from the first memory area and the output data read from the second memory area on a basis of a sum of the output data read from the first memory area and the output data read from the second memory area.

4. A safety computing device comprising:

a processor that executes a program process on input data; and a memory that stores the input data input to the processor and output data that is a result of the program process, wherein the memory is capable of storing the input data and the output data in each of a first memory area and a second memory area having an address different from an address of the first memory area, and the processor includes an execution control unit that performs a first process, which includes a redundancy check and the program process performed on the input data written in the first memory area and addition of a redundancy code to the output data that is a result of the program process and is written in the first memory area, and a second process, which includes a redundancy check and the program process performed on the input data written in the second memory area and addition of a redundancy code to the output data that is a result of the program process and is written in the second memory area, a result collating unit that collates the output data to which the redundancy code is added in the first process and the output data to which the redundancy code is added in the second process, a computation diagnosis unit that diagnoses, by computation, presence or absence of a failure in the processor and the memory, and an abnormality processing unit that, when an abnormality is detected by at least one of the redundancy check performed on the input data by the execution control unit, a collation performed by the result collating unit, and a diagnosis performed by the computation diagnosis unit, stops outputting the output data, wherein the execution control unit reverses an endian of one of the output data to be written in the first memory area and the output data to be written in the second memory area, and the result collating unit collates the output data read from the first memory area and the output data read from the second memory area after reversing an endian of one of the output data read from the first memory area and the output data read from the second memory area.

5. A safety computing device comprising:

a processor that executes a program process on input data; and a memory that stores the input data input to the processor and output data that is a result of the program process, wherein the memory is capable of storing the input data and the output data in each of a first memory area and a second memory area having an address different from an address of the first memory area, and the processor includes an execution control unit that performs a first process, which includes a redundancy check and the program process performed on the input data written in the first memory area and addition of a redundancy code to the output data that is a result of the program process and is written in the first memory area, and a second process, which includes a redundancy check and the program process performed on the input data written in the second memory area and addition of a redundancy code to the output data that is a result of the program process and is written in the second memory area, a result collating unit that collates the output data to which the redundancy code is added in the first process and the output data to which the redundancy code is added in the second process, a computation diagnosis unit that diagnoses, by computation, presence or absence of a failure in the processor and the memory, and an abnormality processing unit that, when an abnormality is detected by at least one of the redundancy check performed on the input data by the execution control unit, a collation performed by the result collating unit, and a diagnosis performed by the computation diagnosis unit, stops outputting the output data, wherein the execution control unit uses a program created as a 16-bit compiler in the program process to be performed on the input data read from the first memory area and uses a program created as a 32-bit compiler in the program process to be performed on the input data read from the second memory area.

6. A safety computing device comprising:

a processor that executes a program process on input data; and a memory that stores the input data input to the processor and output data that is a result of the program process, wherein the memory is capable of storing the input data and the output data in each of a first memory area and a second memory area having an address different from an address of the first memory area, and the processor includes a message processing unit that performs an input message process of performing a redundancy check by decoding a redundancy code added to an input message that includes the input data and an output message process of obtaining an output message by adding a redundancy code to the output data, an execution control unit that performs a first process, which includes control computation performed on the input message written in the first memory area and writing of the output message obtained by the output message process into the first memory area, and a second process, which includes control computation performed on the input message written in the second memory area and writing of the output message on which the output message process is performed into the second memory area, a result collating unit that collates the output message written in the first memory area and the output message written in the second memory area, a computation diagnosis unit that diagnoses, by computation, presence or absence of a failure in the processor and the memory, and an abnormality processing unit that, when an abnormality is detected by at least one of the redundancy check performed on the input data by the message processing unit, a collation performed by the result collating unit, and a diagnosis performed by the computation diagnosis unit, stops outputting the output message.

7. A safety input device comprising:

an input unit that digitalizes an input signal to obtain input data;

a processor that executes a program process on the input data; and
a memory that stores the input data input to the processor, wherein
the memory is capable of storing the input data in each of a first memory area and a second memory area having an address different from an address of the first memory area,
the processor includes
an input diagnosis unit that diagnoses presence or absence of an abnormality in the input unit by transmitting a test signal to the input unit,
a message processing unit that performs an input message process of obtaining an input message by adding a redundancy code to the input data,
an execution control unit that performs a first process, which includes a computation process performed on the input data and writing of the input message into the first memory area, and a second process, which includes a computation process performed on the input data and writing of the input message into the second memory area,
a result collating unit that collates the input message written in the first memory area and the input message written in the second memory area, and
a transmitting unit that transmits the input message to a safety computing device that performs a computation process for safety control, and
when an abnormality is detected by at least one of a diagnosis performed by the input diagnosis unit and a collation performed by the result collating unit, the transmitting unit stops transmitting the input message.

8. A safety output device comprising:
a processor that executes a program process on an output message;
a memory that stores output data included in the output message; and
an output unit that outputs an output signal in accordance with the output data, wherein
the memory is capable of storing the output data in each of a first memory area and a second memory area having an address different from an address of the first memory area,
the processor includes
a receiving unit that receives the output message from a safety computing device that performs a computation process for safety control,
a message processing unit that performs an output message process of checking content of the output message on a basis of a redundancy code included in the output message,
an execution control unit that performs a first process, which includes checking of content of the output message and writing of the output data into the first memory area, and a second process, which includes checking of content of the output message and writing of the output data into the second memory area,
a result collating unit that collates the output data written in the first memory area and the output data written in the second memory area, and
an output diagnosis unit that diagnoses presence or absence of an abnormality in the output unit by transmitting a test signal to the output unit, and
when an abnormality is detected by at least one of a diagnosis performed by the output diagnosis unit and a collation performed by the result collating unit, the output unit stops outputting the output signal.

9. A safety controller comprising:
a safety input device that receives an input of an input signal to the safety controller;
a safety computing device that performs a computation process for safety control; and
a safety output device that outputs an output signal from the safety controller, wherein
the safety computing device includes
a processor that executes a program process on input data from the safety input device, and
a memory that stores the input data input to the processor and output data that is a result of the program process,
the memory is capable of storing the input data and the output data in each of a first memory area and a second memory area having an address different from an address of the first memory area, and
the processor includes
an execution control unit that performs a first process, which includes a redundancy check and the program process performed on the input data written in the first memory area and addition of a redundancy code to the output data that is a result of the program process and is written in the first memory area, and a second process, which includes a redundancy check and the program process performed on the input data written in the second memory area and addition of a redundancy code to the output data that is a result of the program process and is written in the second memory area,
a result collating unit that collates the output data to which the redundancy code is added in the first process and the output data to which the redundancy code is added in the second process,
a computation diagnosis unit that diagnoses, by computation, presence or absence of a failure in the processor and the memory, and
an abnormality processing unit that, when an abnormality is detected by at least one of the redundancy check performed on the input data by the execution control unit, a redundancy check performed on the output data by the safety output device, a collation performed by the result collating unit, and a diagnosis performed by the computation diagnosis unit, stops outputting the output data.

10. A safety controller comprising:
a safety input device that receives an input of an input signal to the safety controller;
a safety computing device that performs a computation process for safety control; and
a safety output device that outputs an output signal from the safety controller, wherein
the safety input device includes
an input unit that digitalizes an input signal to obtain input data,
a processor that executes a program process on the input data, and
a memory that stores the input data input to the processor,
the memory is capable of storing the input data in each of a first memory area and a second memory area having an address different from an address of the first memory area,
the processor includes
an input diagnosis unit that diagnoses presence or absence of an abnormality in the input unit by transmitting a test signal to the input unit,
a message processing unit that performs an input message process of obtaining an input message by adding a redundancy code to the input data, an execution control unit that performs a first process, which includes a computation process performed on the input data and writing of the input message into the first memory area, and a second process, which includes a computation process performed on the input data and writing of the input message into the second memory area, a result collating unit that collates the input message written in the first memory area and the input message written in the second memory area, and a transmitting unit that transmits the input message to the safety computing device, and when an abnormality is detected by at least one of a diagnosis performed by the input diagnosis unit and a collation performed by the result collating unit, the transmitting unit stops transmitting the input message.

11. A safety controller comprising:

a safety input device that receives an input of an input signal to the safety controller;

a safety computing device that performs a computation process for safety control; and a safety output device that outputs an output signal from the safety controller, wherein the safety output device includes a processor that executes a program process on an output message from the safety computing device, a memory that stores output data included in the output message, and an output unit that outputs an output signal in accordance with the output data, the memory is capable of storing the output data in each of a first memory area and a second memory area having an address different from an address of the first memory area, the processor includes a receiving unit that receives the output message from the safety computing device, a message processing unit that performs an output message process of checking content of the output message on a basis of a redundancy code included in the output message, an execution control unit that performs a first process, which includes checking of content of the output message and writing of the output data into the first memory area, and a second process, which includes checking of content of the output message and writing of the output data into the second memory area, a result collating unit that collates the output data written in the first memory area and the output data written in the second memory area, and an output diagnosis unit that diagnoses presence or absence of an abnormality in the output unit by transmitting a test signal to the output unit, and when an abnormality is detected by at least one of a diagnosis performed by the output diagnosis unit and a collation performed by the result collating unit, the output unit stops outputting the output signal.

\* \* \* \* \*